(12) United States Patent
Iwane (10) Patent No.: US 9,933,627 B2
(45) Date of Patent: Apr. 3, 2018

(54) OPTICAL SYSTEM, OPTICAL MEMBER, MICROMIRROR ARRAY, DISPLAY DEVICE, AND IMAGE- CAPTURING DEVICE

(71) Applicant: NIKON CORPORATION, Tokyo (JP)

(72) Inventor: Toru Iwane, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 183 days.

(21) Appl. No.: 14/768,628

(22) PCT Filed: Feb. 24, 2014

(86) PCT No.: PCT/JP2014/054358
§ 371 (c)(1),
(2) Date: Dec. 2, 2015

(87) PCT Pub. No.: WO2014/129630
PCT Pub. Date: Aug. 28, 2014

(65) Prior Publication Data
US 2016/0077351 A1 Mar. 17, 2016

(30) Foreign Application Priority Data
Feb. 25, 2013 (JP) .................................. 2013-034585

(51) Int. Cl.
*G02F 1/1335* (2006.01)
*G02B 27/26* (2006.01)
(Continued)

(52) U.S. Cl.
CPC ........... *G02B 27/26* (2013.01); *G02B 5/3016* (2013.01); *G02B 5/3083* (2013.01);
(Continued)

(58) Field of Classification Search
CPC ... G02F 1/1335; G02F 1/13362; G02B 27/26; G02B 17/002; G02B 5/3016; G02B 27/286; G03B 35/24
See application file for complete search history.

(56) References Cited

U.S. PATENT DOCUMENTS 6,853,491 B1 * 2/2005 Ruhle .................. G02B 5/3016
349/11
8,183,753 B2 * 5/2012 Kanade ..................... F21V 9/16
313/110
(Continued)

FOREIGN PATENT DOCUMENTS

CN      102870032 A    1/2013
JP      2000-102038 A  4/2000
(Continued)

OTHER PUBLICATIONS

Li, Yan et al., "Design Optimization of Reflective Polarizers for LCD Backlight Recycling," Journal of Display Technology, vol. 5, No. 8, Aug. (2009), pp. 335-340.
(Continued)

*Primary Examiner* — Timothy L Rude
(74) *Attorney, Agent, or Firm* — Oliff PLC (57) ABSTRACT

An optical system includes: a first optical member having a concave surface that reflects a light having a first circularly polarized light component and transmits a light having a second circularly polarized light component a rotation direction of which is opposite to a rotation direction of the first circularly polarized light component; and a second optical member that transforms the light having the first circularly polarized light component reflected from the first optical member into the light having the second circularly polarized light component to be reflected so as to be incident on the first optical member.

17 Claims, 7 Drawing Sheets

(51) Int. Cl.
*G03B 35/24* (2006.01)
*G02B 5/30* (2006.01)
*G02B 17/00* (2006.01)
*G02B 27/28* (2006.01)
*H04N 13/02* (2006.01)
*H04N 13/04* (2006.01)

(52) U.S. Cl.
CPC ......... *G02B 17/002* (2013.01); *G02B 27/285* (2013.01); *G02B 27/286* (2013.01); *G02F 1/13362* (2013.01); *G03B 35/24* (2013.01); *H04N 13/0228* (2013.01); *H04N 13/0404* (2013.01)

(56) References Cited

U.S. PATENT DOCUMENTS

| | | | |
|---|---|---|---|
| 2001/0014061 A1* | 8/2001 | Ueyanagi | B82Y 10/00 369/44.23 |
| 2004/0222945 A1 | 11/2004 | Taira et al. | |
| 2005/0174524 A1* | 8/2005 | Yuh | G02F 1/133526 349/158 |
| 2007/0070508 A1* | 3/2007 | Ruhle | G02B 5/3016 359/630 |
| 2010/0238276 A1 | 9/2010 | Takagi et al. | |
| 2010/0245713 A1* | 9/2010 | Yano | G02F 1/133604 349/64 |
| 2012/0062846 A1* | 3/2012 | Dike | G02B 27/0101 353/10 |
| 2012/0092586 A1* | 4/2012 | He | G02F 1/29 349/61 |
| 2012/0147465 A1* | 6/2012 | Ruhle | G02B 5/3016 359/465 |
| 2012/0162592 A1* | 6/2012 | Takagi | G02B 27/2214 349/139 |
| 2012/0280987 A1 | 11/2012 | Iwane | |
| 2013/0235304 A1* | 9/2013 | Lee | G02F 1/133526 349/96 |
| 2016/0187760 A1* | 6/2016 | Kim | G02F 1/29 349/139 |
| 2017/0242258 A1* | 8/2017 | Edwards | G02B 27/027 |

FOREIGN PATENT DOCUMENTS

| | | |
|---|---|---|
| JP | 2004-258631 A | 9/2004 |
| JP | 2005-091744 A | 4/2005 |
| JP | 2005-148655 A | 6/2005 |
| JP | 2008-250187 A | 10/2008 |
| JP | 2009-237461 A | 10/2009 |
| JP | 2010-224191 A | 10/2010 |
| JP | 2012-022307 A | 2/2012 |

OTHER PUBLICATIONS

May 20, 2014 Search Report issued in International Patent Application No. PCT/JP2014/054358.

Mar. 29, 2017 Office Action issued in Chinese Patent Application No. 201480010096.8.

Nov. 24, 2017 Office Action issued in Chinese Patent Application No. 201480010096.8.

* cited by examiner

OPTICAL SYSTEM, OPTICAL MEMBER, MICROMIRROR ARRAY, DISPLAY DEVICE, AND IMAGE- CAPTURING DEVICE

TECHNICAL FIELD

The present invention relates to an optical system, an optical member, a micromirror array, a display device, and an image-capturing device.

BACKGROUND ART

Conventionally, techniques for viewing stereoscopic images with a combination of a microlens array including a plurality of microlenses with a display element are well known. For example, PTL1 discloses an image display device comprising a microlens array having a plurality of microlenses arranged two-dimensionally, the plurality of microlenses synthesizing light bundles emitted from a plurality of display pixels to form a three-dimensional image.

CITATION LIST

Patent Literature

PTL1: Japanese Laid-Open Patent Publication No. 2012-22307

SUMMARY OF INVENTION

Technical Problem

In the three-dimensional image display device disclosed in PTL1, it is necessary to arrange the display element at the focus position of the microlens. However, it is difficult to reduce the focal length of the microlens in terms of optical performance, with the result that it is difficult to make the entire three-dimensional display device thinner.

Solution to Problem

According to the 1st aspect of the present invention, an optical system comprises: a first optical member having a concave surface that reflects a light having a first circularly polarized light component and transmits a light having a second circularly polarized light component a rotation direction of which is opposite to a rotation direction of the first circularly polarized light component; and a second optical member that transforms the light having the first circularly polarized light component reflected from the first optical member into the light having the second circularly polarized light component to be reflected so as to be incident on the first optical member.

According to the 2nd aspect of the present invention, in the optical system according to the 1st aspect, it is preferred that: the second optical member comprises a polarizer plate that transmits a light having a first linearly polarized light component and reflects a light having a second linearly polarized light component which is orthogonal to the first linearly polarized light component, and a wave plate that transforms the light having the first linearly polarized light component into the light having the first circularly polarized light component.

According to the 3rd aspect of the present invention, a display device comprises: a plurality of optical systems each including a first optical member having a concave surface that reflects a light having a first circularly polarized light component and transmits a light having a second circularly polarized light component a rotation direction of which is opposite to a rotation direction of the first circularly polarized light component, and a second optical member that transforms the light having the first circularly polarized light component reflected from the first optical member into the light having the second circularly polarized component to be reflected so as to be incident on the first optical member; and a display unit having a display surface that is arranged adjacent to the plurality of optical systems.

According to the 4th aspect of the present invention, in the display device according to the 3rd aspect, it is preferred that: the display surface is arranged in a position that is optically substantially equivalent to a focus position of the concave surface.

According to the 5th aspect of the present invention, in the display device according to the 3rd or 4th aspect, it is preferred that: the plurality of optical systems are arranged each corresponding to a plurality of display pixels of the display surface.

According to the 6th aspect of the present invention, in the display device according to any one of the 3rd to 5th aspects, it is preferred that: observation of three-dimensional images and observation of two-dimensional images are possible.

According to the 7th aspect of the present invention, in the display device according to the 6th aspect, it is preferred that: the second optical member includes a liquid crystal plate, and the observation of three-dimensional images and the observation of two-dimensional images are switched by switching an applied voltage to the liquid crystal plate.

According to the 8th aspect of the present invention, an optical system comprises: a polarizer plate that transmits a light having a first linearly polarized light component and reflects a light having a second linearly polarized light component which is orthogonal to the first linearly polarized light component; a wave plate that transforms the light having the first linearly polarized light component into a light having a first circularly polarized light component; and an optical member having a concave surface that reflects the light having the first circularly polarized light component and transmits a light having a second circularly polarized light component a rotation direction of which is opposite to a rotation direction of the first circularly polarized light component.

According to the 9th aspect of the present invention, a display device comprises: a plurality of optical systems each including a polarization plate that transmits a light having a first linearly polarized light component and reflects a light having a second linearly polarized light component which is orthogonal to the first linearly polarized light component, a wave plate that transforms the light having the first linearly polarized light component into a light having a first circularly polarized light component, and an optical member having a concave surface that reflects the light having the first circularly polarized light component and transmits a light having a second circularly polarized light component a rotation direction of which is opposite to a rotation direction of the first circularly polarized light component; and a display unit having a display surface that is arranged adjacent to the plurality of optical systems.

According to the 10th aspect of the present invention, an optical member comprises: a reflective linear polarizer plate that transmits a first linearly polarized light component and reflects a second linearly polarized light component which is orthogonal to the first linearly polarized light; a quarter-wave plate that is arranged facing one surface of the reflective linear polarizer plate; and a reflective mirror that has a concave surface facing the quarter-wave plate and reflects a first circularly polarized light component having a rotation direction corresponding to the first linearly polarized light component incident on the concave surface and transmits a second circularly polarized light component having a rotation direction opposite to a rotation direction of the first circularly polarized light component.

According to the 11th aspect of the present invention, in the optical member according to the 10th aspect, it is preferred that the optical member further comprises: a switching member that is arranged between the quarter-wave plate and the reflective linear polarizer plate, wherein it is possible to electrically switch between a first state in which the switching member has the substantially same optical characteristics as that of a half-wave plate and a second state in which the switching member transmits the incident light with its polarization condition being unchanged.

According to the 12th aspect of the present invention, in the optical member according to the 10th or 11th aspect, it is preferred that: the reflective mirror has a transparent substrate having the concave surface formed therein.

According to the 13th aspect of the present invention, in the optical member according to the 12th aspect, it is preferred that: the reflective mirror includes a filling member that is filled in the concave surface, the filling member having the same refractive index as that of the transparent substrate.

According to the 14th aspect of the present invention, in the optical member according to any one of the 10th to 13th aspects, it is preferred that: a cholesteric liquid crystal is applied on one of the concave surface and a convex surface which is a back side of the concave surface.

According to the 15th aspect of the present invention, a micromirror array comprises: a plurality of optical members each corresponding to an optical member according to any one of the 10th to 14th aspects and arranged one-dimensionally or two-dimensionally.

According to the 16th aspect of the present invention, a display device comprises: a micromirror array according to the 15th aspect; and a display unit that is arranged so that a display surface faces one of the reflective linear polarizer plate and a back side of the concave surface.

According to the 17th aspect of the present invention, an image-capturing device comprises: a micromirror array according to the 15th aspect; and an image sensor that is arranged so that an image-capturing surface faces one of the reflective linear polarizer plate and a back side of the concave surface.

Advantageous Effects of Invention

According to the present invention, it is possible to make an optical system, an optical member, a micromirror array, a display device, and an image-capturing device thinner.

DESCRIPTION OF EMBODIMENTS

First Embodiment

Figure 1:
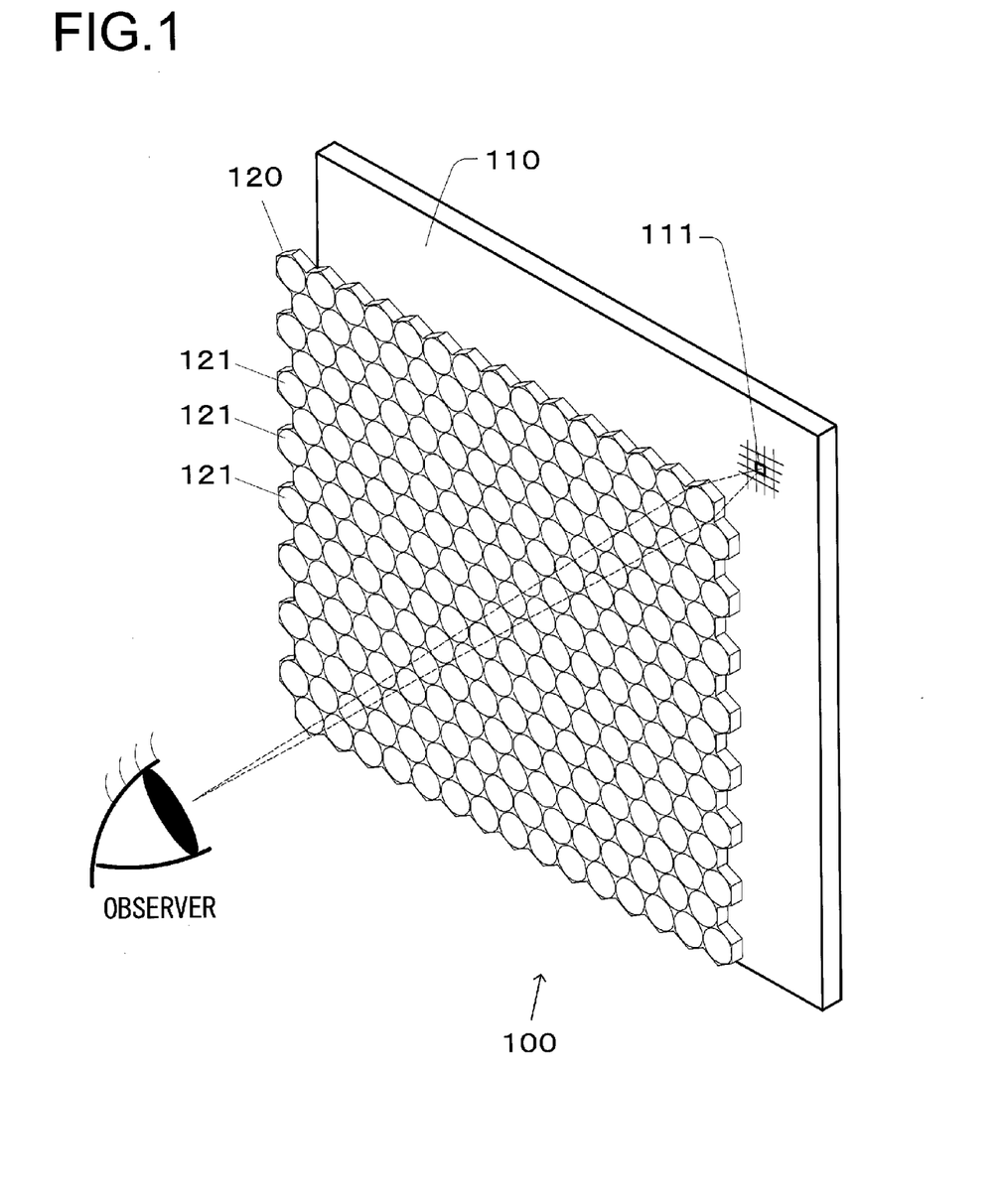
FIG. 1 is a perspective view schematically illustrating a configuration of a display device according to a first embodiment of the present invention.

FIG. 1 is a perspective view schematically illustrating a configuration of a display device according to a first embodiment of the present invention. The display device 100 is a so-called integral photography type stereoscopic display device including a liquid crystal display 110 and a micromirror array 120 that is arranged facing a display surface of the liquid crystal display 110. A large number of display pixels 111 having a rectangular shape are two-dimensionally arranged in a square manner on the display surface of the liquid crystal display 110.

The micromirror array 120 is an array in which a large number of micromirrors 121 having a circular shape are two-dimensionally arranged in a staggered manner. There is a plurality of display pixels 111 in a range covered by one micromirror 121 in the entire display surface of the liquid crystal display 110.

Although FIG. 1 schematically illustrates the micromirror array 120 and the liquid crystal display 110 having a gap therebetween, there is little or no gap between the micromirror array 120 and the liquid crystal display 110 in practice. In this embodiment, the micromirror array 120 is formed in a thin film form and adhered to the display surface of the liquid crystal display 110.

For example, an image photographed through the micromirror array 120 is displayed on the display surface of the liquid crystal display 110. When an observer observes the image displayed on the liquid crystal display 110 through the micromirror array 120, she/he can visually recognize a three-dimensional stereoscopic image. Such a viewing scheme of three-dimensional images is well known as the integral photography scheme.

(Description of Configuration of Micromirrors)

Figure 2:
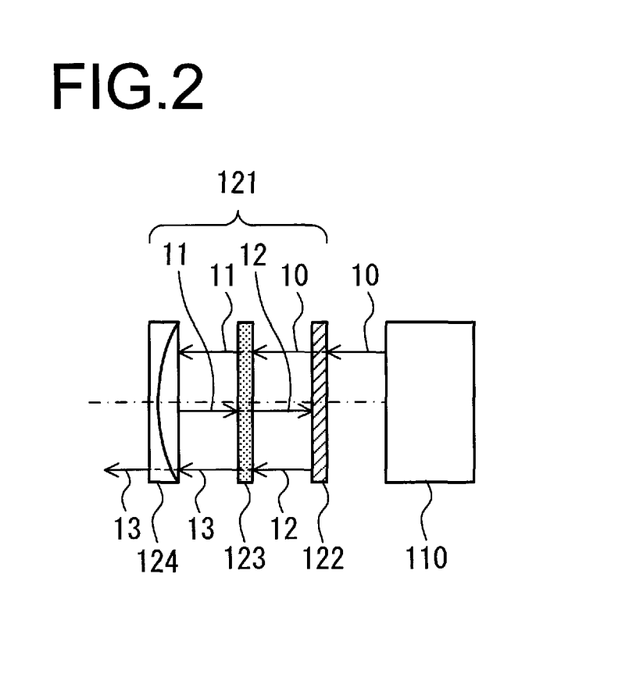
FIG. 2 is a cross-sectional view schematically illustrating a configuration of a microlens according to a first embodiment.

FIG. 2 is a cross-sectional view schematically illustrating a configuration of the micromirror 121. The micromirror array 120 is an array in which a large number of micromirrors 121 illustrated in FIG. 2 are two-dimensionally arranged. Although, for the sake of simplicity, members constituting one micromirror 121 and the liquid crystal display 110 are separate from each other in FIG. 2, the members are formed in contact with each other in practice.

The micromirror 121 is formed by stacking a reflective linear polarizer plate 122, a quarter-wave (¼λ) plate 123, and a reflective mirror 124 in this order from the display surface side of the liquid crystal display 110.

The reflective linear polarizer plate 122 has a function of reflecting a S-polarized light component of an incident light and transmitting a P-polarized light component. The quarter-wave plate 123 is oriented to 45 degree with respect to an axis of the reflective linear polarizer plate 122.

The reflective mirror 124 is created by forming a concave surface in a transparent substrate and then filling the concave surface with an optical adhesive having the same refractive index as that of the transparent substrate. A cholesteric liquid crystal is applied on the concave surface (or a convex surface which is the back side of the concave surface) to form a circularly polarized light splitting layer. The circularly polarized light splitting layer made of the cholesteric liquid crystal transmits left circularly polarized light and reflects right circularly polarized light, wherein the right circularly polarized light is unchanged. The reflective mirror 124 is arranged so that the display surface of the liquid crystal display 110 is located at a focus position of the reflective mirror 124. Because the concave surface acts as a reflective mirror for the right circularly polarized light, the focal length f of the concave surface is R/2, where R is a radius of curvature of the concave surface. In contrast to this, in conventional plano-convex microlenses, the focal length f is 2R. In other words, the focal length f can be one fourth in length by the use of the reflective mirror 124, in comparison with conventional mirrors.

Functions of the micromirror 121 thus formed will be described. A light having the P-polarization 10 exits from the display surface of the liquid crystal display 110 arranged in the right side of FIG. 2 towards the reflective linear polarizer plate 122. The light having the P-polarization 10 transmits through the reflective linear polarizer plate 122 and is incident on the quarter-wave plate 123. The light then passes through the quarter-wave plate 123 to turn into a right circularly polarized light 11 and is further incident on the concave surface of the reflective mirror 124. As described above, the concave surface acts as a concave mirror for the right circularly polarized light 11, by the effect of the circularly polarized light splitting layer.

The right circularly polarized light 11 reflects from the concave surface of the reflective mirror 124 and directs again towards the quarter-wave plate 123. The right circularly polarized light 11 passes through the quarter-wave plate 123 to turn into a light having the S-polarization 12 and is further incident on the reflective linear polarizer plate 122. The reflective linear polarizer plate 122 reflects the light having the S-polarization 12. The reflected light having the S-polarization 12 passes through the quarter-wave plate 123 to turn into a left circularly polarized light 13 and then transmits through the reflective mirror 124 to direct towards the observer. The left circularly polarized light 13, which transmits through the reflective mirror 124, is not refracted by the concave surface because the concave surface of the reflective mirror 124 is filled with the optical adhesive having the same refractive index as that of the transparent substrate as described above.

Thus, a light bundle having a focal point on the display surface of the liquid crystal display 110 exits from the micromirror array 120 towards the observer.

With the display device according to the first embodiment described above, the following operations and advantageous effects can be achieved.

(1) The micromirror 121 includes the quarter-wave plate 123; the reflective linear polarizer plate 122 that is arranged facing one surface of the quarter-wave plate 123 and transmits the P-polarized light component and reflects the S-polarized light component; and the reflective mirror 124 that has the concave surface facing the other surface of the quarter-wave plate 123 and reflects the right circularly polarized light component and transmits the left circularly polarized light component both incident on the concave surface. In this way, the display device 100 with the micromirror array 120 can be made thinner. Furthermore, in comparison with conventional microlenses, it is possible to provide a micromirror that has a small maximum aperture value (has a high brightness) and exhibits no chromatic aberration.

(2) The reflective mirror 124 has the transparent substrate having the concave surface formed therein, wherein the concave surface is filled with the optical adhesive having the same refractive index as that of the transparent substrate. In this way, the left circularly polarized light component can transmit through the reflective mirror 124 without refracted by the concave surface.

(3) The display device 100 includes the micromirror array 120 that has a plurality of micromirrors 121 arranged two-dimensionally and the liquid crystal display 110 that is arranged so that the display surface faces the back side of the concave surface of the reflective mirror 124. In this way, it is possible to make the display device 100 thinner.

Second Embodiment

The display device according to the first embodiment described above has a problem of a decrease in contrast of images displayed on the liquid crystal display 110 due to outside light incident on the micromirror 121 from the observer side. A configuration of a display device according to a second embodiment that solves this problem will now be described.

Figure 3:
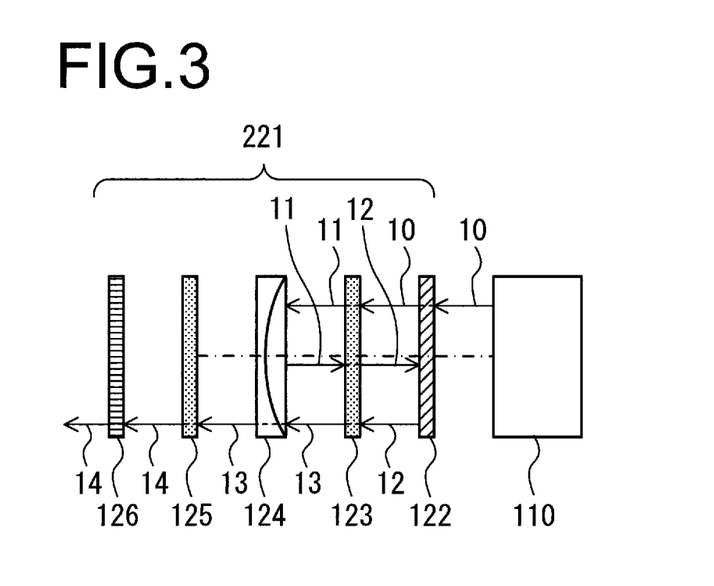
FIG. 3 is a cross-sectional view schematically illustrating a configuration of a microlens according to a second embodiment.

FIG. 3 is a cross-sectional view schematically illustrating a configuration of a micromirror according to the second embodiment. In the following description, differences from the display device according to the first embodiment will be described. The same members will be denoted by the same reference numerals as that in the first embodiment, and description thereof will be omitted.

On the basis of the micromirror 121 according to the first embodiment, the micromirror 221 further includes a quarter-wave plate 125 facing the convex surface (the back side of the concave surface where the circularly polarized light splitting layer is formed) of the reflective mirror 124; and an absorptive linear polarizer plate 126 facing the convex surface of the reflective mirror 124 via the quarter-wave plate 125. The quarter-wave plate 125 is a member having the same configuration as that of the quarter-wave plate 123 described already above. The absorptive linear polarizer plate 126 has a function of absorbing a S-polarized light component of an incident light and transmitting a P-polarized light component of the incident light.

A light having the P-polarization 10 exits from the display surface of the liquid crystal display 110 arranged in the right side of FIG. 3 towards the reflective linear polarizer plate 122. The light 10 follows the path described in the first embodiment to turn into a left circularly polarized light 13 and then exits from the reflective mirror 124. The left circularly polarized light 13 passes through the quarter-wave plate 125 to turn into a light having the P-polarization 14 and then transmits through the absorptive linear polarizer plate 126 towards the observer.

The outside light incident on the micromirror 221 from the observer side will now be described. If the absorptive linear polarizer plate 126 and the quarter-wave plate 125 are absent (i.e. if the configuration is the same as that in the first embodiment illustrated in FIG. 2), the right circularly polarized light component of the outside light directing towards the reflective mirror 124 from the left side of FIG. 2 reflects from the convex surface of the reflective mirror 124 towards the observer side. In other words, a decrease in contrast of the image to be observed occurs because the outside light is reflected from the reflective mirror 124 and returned to the observer side.

On the other hand, in this embodiment, the S-polarized light component of the outside light is absorbed by the absorptive linear polarizer plate 126 and only the P-polarized light component transmits through the absorptive linear polarizer plate 126. The light having the P-polarized light component passes through the quarter-wave plate 125 to turn into the light having the right polarized light component. Then the light reflects from the convex surface of the reflective mirror 124 and directs again towards the quarter-wave plate 125. The right circularly polarized light component passes through the quarter-wave plate 125 to turn into a S-polarized light, which is absorbed by the absorptive linear polarizer plate 126. Thus, the entire outside light is absorbed by the absorptive linear polarizer plate 126.

With the display device according to the second embodiment described above, the following operations and advantageous effect can be achieved.

(1) The micromirror 221 includes the absorptive linear polarizer plate 126 that is arranged facing the convex surface of the reflective mirror 124 and transmits the P-polarized light component and absorbs the S-polarized light component; and the quarter-wave plate 125 that is provided between the reflective mirror 124 and the absorptive linear polarizer plate 126. In this way, a decrease in contrast of the observed image due to the outside light can be prevented.

Third Embodiment

A display device according to a third embodiment of the present invention will now be described. In the following description, differences from the display device according to the second embodiment will be described. The same members will be denoted by the same reference numerals as that in the second embodiment, and description thereof will be omitted.

Figure 4:
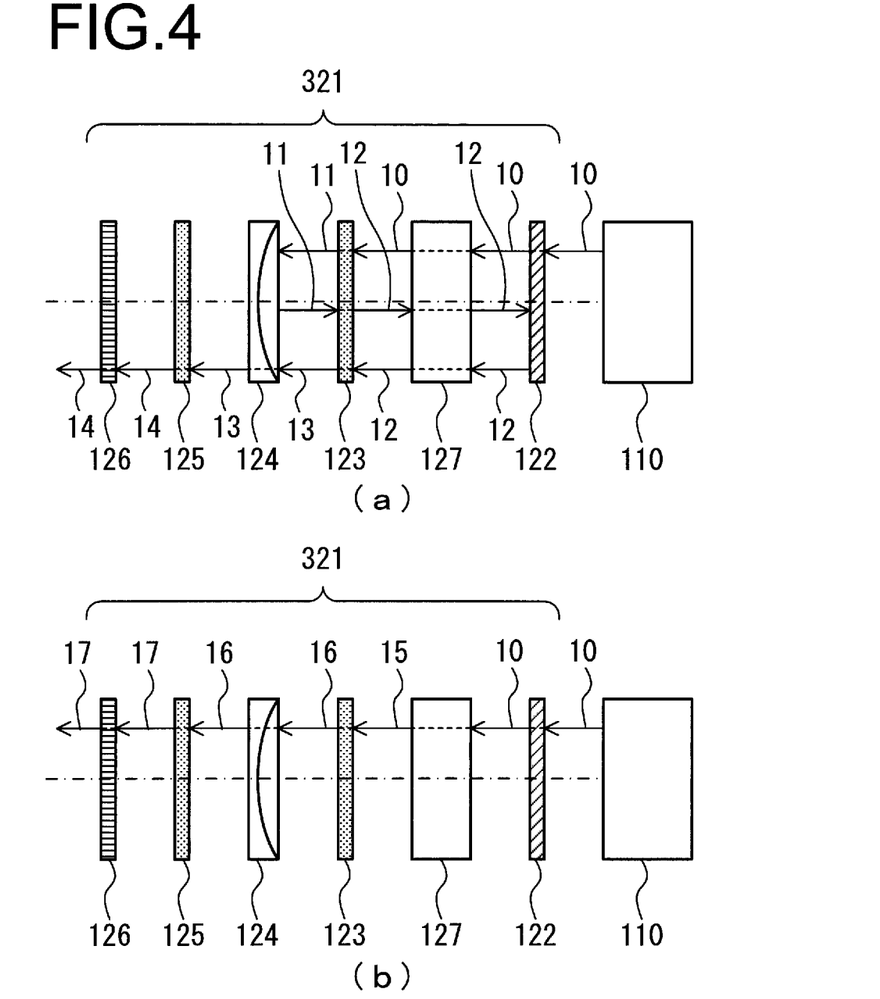
FIG. 4 is a cross-sectional view schematically illustrating a configuration of a microlens according to a third embodiment.

FIG. 4(a) is a cross-sectional view schematically illustrating a configuration of a micromirror according to the third embodiment. On the basis of the micromirror 221 according to the second embodiment, the micromirror 321 further includes a liquid crystal plate 127 provided between the reflective linear polarizer plate 122 and the quarter-wave plate 123.

The liquid crystal plate 127 is created by forming a liquid crystal layer made of a liquid crystal element between a pair of transparent substrates having transparent electrodes attached thereon, wherein an orientation direction of the liquid crystal element changes depending on presence/absence of an applied voltage across the transparent electrodes (presence/absence of an applied voltage to the liquid crystal layer) in such a manner that it can be switched whether an incident light exits from the liquid crystal plate 127 unchanged or with a phase shift of 180 degree. For example, if the voltage is applied, the incident light passes through the liquid crystal plate 127 unchanged, while if the voltage is not applied, the incident light exits with a phase shift of 180 degree. In other words, the liquid crystal plate 127 is a member that provides the same effect as insertion/removal of a half-wave polarizer plate at the position of the liquid crystal plate 127, depending on presence/absence of an applied voltage. Such members are well known as TN-type or STN-type liquid crystal panels, for example.

With the display device according to this embodiment, observation of two-dimensional images can be achieved in addition to observation of three-dimensional images. If observation of three-dimensional images is desired, the display device applies the voltage to the liquid crystal plate 127. Here, as illustrated in FIG. 4(a), the light incident on the liquid crystal plate 127 exits from the liquid crystal plate 127 with its polarization direction being unchanged from that at the time of the incidence. Therefore, the micromirror 321 functions in the same manner as the micromirror 221 in the second embodiment described in FIG. 3.

On the other hand, if observation of two-dimensional image is desired, the display device does not apply the voltage to the liquid crystal plate 127. Here, as illustrated in FIG. 4(b), when the light having the P-polarization 10 exiting from the liquid crystal display 110 is incident on the liquid crystal plate 127, a phase shift of 180 degree is caused by the liquid crystal layer of the liquid crystal plate 127, so that the light turns into a light having the S-polarization 15. The light having the S-polarization 15 passes through the quarter-wave plate 123 to turn into a left circularly polarized light 16 and then directs towards the reflective mirror 124. The left circularly polarized light 16 transmits through the circularly polarized light splitting layer of the reflective mirror 124 and then passes through the quarter-wave plate 125 to turn into a light having the P-polarization 17. The light having the P-polarization 17 transmits through the absorptive linear polarizer plate 126 and directs towards the observer. In other words, if the voltage is not applied to the liquid crystal plate 127, the light from the liquid crystal display 110 simply passes through the micromirror 321 towards the observer.

With the display device according to the third embodiment described above, the following operations and advantageous effect can be achieved.

(1) The micromirror 321 includes the liquid crystal plate 127 that is arranged between the the quarter-wave plate 123 and the reflective linear polarizer plate 122, wherein it is possible to electrically switch between a state in which the liquid crystal plate 127 has the substantially same optical characteristic as that of a half-wave plate and a state in which the liquid crystal plate 127 transmits the incident light with its polarization condition being unchanged. In this way, observation of three-dimensional images and observation of two-dimensional images can be electrically switched.

Fourth Embodiment

A display device according to a fourth embodiment of the present invention will now be described. In the following description, differences from the display device according to the second embodiment will be described. The same members will be denoted by the same reference numerals as that in the second embodiment, and description thereof will be omitted.

Figure 5:
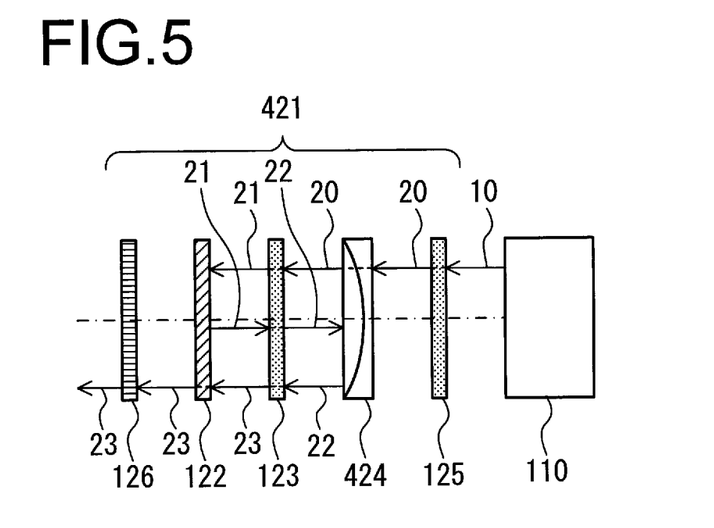
FIG. 5 is a cross-sectional view schematically illustrating a configuration of a microlens according to a fourth embodiment.

FIG. 5 is a cross-sectional view schematically illustrating a configuration of a micromirror according to the fourth embodiment. The micromirror 421 includes a reflective linear polarizer plate 122, a quarter-wave plate 123, a reflective mirror 424, a quarter-wave plate 125, and an absorptive linear polarizer plate 126, in a same manner as the micromirror 221 according to the second embodiment. A circularly polarized light splitting layer of the reflective mirror 424 is configured to transmit a right circularly polarized light component and reflect a left circularly polarized light component, in contrast to the second embodiment.

Arrangement of the members constructing the micromirror 421 is different from that of the second embodiment. Specifically, the members are arranged in an order of the quarter-wave plate 125, the reflective mirror 424, the quarter-wave plate 123, the reflective linear polarizer plate 122, and the absorptive linear polarizer plate 126, from the display surface of the liquid crystal display 110. Furthermore, the reflective mirror 424 is arranged so that its concave surface is convex with respect to the liquid crystal display 110. In other words, the reflective mirror 424 is arranged to orient to the observer side. Moreover, the reflective mirror 424 is arranged so that the display surface of the liquid crystal display 110 is located at a position that is optically equivalent to the focus position of the reflective mirror 424.

Referring to FIG. 5, functions of the micromirror 421 will now be described. A light having the P-polarization 10 exits from the display surface of the liquid crystal display 110 arranged in the right side of FIG. 5 towards the quarter-wave plate 125. The light having the P-polarization 10 passes through the quarter-wave plate 125 to turn into a right circularly polarized light 20. The right circularly polarized light 20 passes through the convex surface of the reflective mirror 424 and directs towards the quarter-wave plate 123. The right circularly polarized light 20, which transmits through the reflective mirror 424, is not refracted by the concave surface because the concave surface of the reflective mirror 424 is filled with the optical adhesive having the same refractive index as that of the transparent substrate as described above.

The right circularly polarized light 20 passes through the quarter-wave plate 123 to turn into a light having the S-polarization 21. The light having the S-polarization 21 directs towards the reflective linear polarizer plate 122 and is reflected by the reflective linear polarizer plate 122 to direct again towards the quarter-wave plate 123. The light then passes through the quarter-wave plate 123 to turn into a left circularly polarized light 22.

The left circularly polarized light 22 directs towards the concave surface of the reflective mirror 424. As described above, the concave surface acts as a concave mirror for the left circularly polarized light 22, by the effect of the circularly polarized light splitting layer. The left circularly polarized light 22 reflects from the concave surface and passes through the quarter-wave plate 123 to turn into a light having the P-polarization 23. The light having the P-polarization 23 directs again towards the reflective linear polarizer plate 122 and transmits through the reflective linear polarizer plate 122 and the absorptive linear polarizer plate 126 to direct towards the observer. Thus, a light bundle having a focal point on the display surface of the liquid crystal display 110 exits from the micromirror 421 towards the observer.

Here, the absorptive linear polarizer plate 126 is provided so that the outside light incident on the micromirror 421 from the observer side is not reflected back to the observer side, in the same manner as in the second embodiment. If the absorptive linear polarizer plate 126 were absent, a S-circularly polarized light component of the outside light incident on the micromirror 421 would be reflected by the reflective linear polarizer plate 122 towards the observer. In this embodiment, a decrease in contrast due to the outside light does not occur because the S-polarized light component of the outer light, which would otherwise be reflected to the observer side, is absorbed by the absorptive linear polarizer plate 126.

Here, by providing the liquid crystal plate 127 described in the third embodiment between the reflective linear polarizer plate 122 and the quarter-wave plate 123, it is possible to switch between observation of three-dimensional images and observation of two-dimensional images in the same manner as in the third embodiment.

With the display device according to the fourth embodiment described above, the following operations and advantageous effect can be achieved.

(1) The concave surface of the reflective mirror 424 orients to the observer side. In this way, even if the circularly polarized light splitting layer formed on the concave surface of the reflective mirror 424 can not completely reflect the left circularly polarized light component (i.e. a part of the left circularly polarized light component transmits through the reflective mirror 424), the light that unintentionally transmits through the reflective mirror 424 is absorbed by the display surface of the liquid crystal display 110 and can not direct towards the observer side.

Fifth Embodiment

A fifth embodiment of the present invention will now be described. The fifth embodiment illustrates an example in which the configuration of the display device described in the above-described embodiments is applied to a head mount display system (head mount display device), which is a proximity-of-eye observation system.

Figure 6:
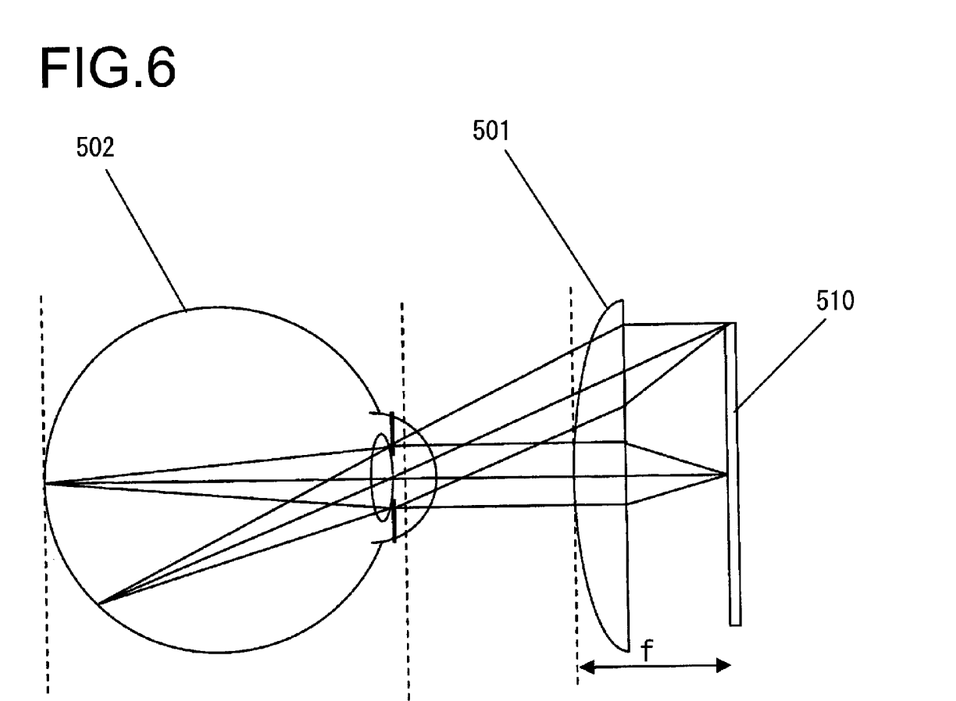
FIG. 6 is a view illustrating a simple proximity-of-eye observation system with a convex lens.

FIG. 6 illustrates a simple proximity-of-eye observation system with a convex lens 501. Referring to this figure, problems in the case of using the convex lens 501 in the head mount display system which is a proximity-of-eye observation system will be described. The head mount display system in FIG. 6 employs a scheme of observing a two-dimensional display element 510 with a loupe. Most head mount display systems are essentially the same as this system, except for only a partial modification in which a display is provided elsewhere or a plurality of lenses are provided by partially extending the optical path in comparison to this type of system, for example.

A problem in this system is that the focal length f has to be reduced for the purpose of miniaturizing the device, which results in a limited diameter of the lens. Specifically, it is necessary that a lens has a curvature of f/2 in order to achieve a focal length f. Then, the diameter can not be larger than f (the lens is a hemisphere if the diameter is f). In addition, as the diameter is increased to be close to this limit, a distortion is also increased to an extent that the device can not be used in practice. Although an increase in the number of the lenses is also one option, this would inevitably lead to an increase in the thickness of the device, so that the aim of miniaturization with the original focal length is inhibited.

For example, provided that the focal length f is 20 mm, the curvature r of the lens is 10 mm, and the lens thickness (periphery to center) is 10 mm in the case of a hemisphere lens.

Figure 7:
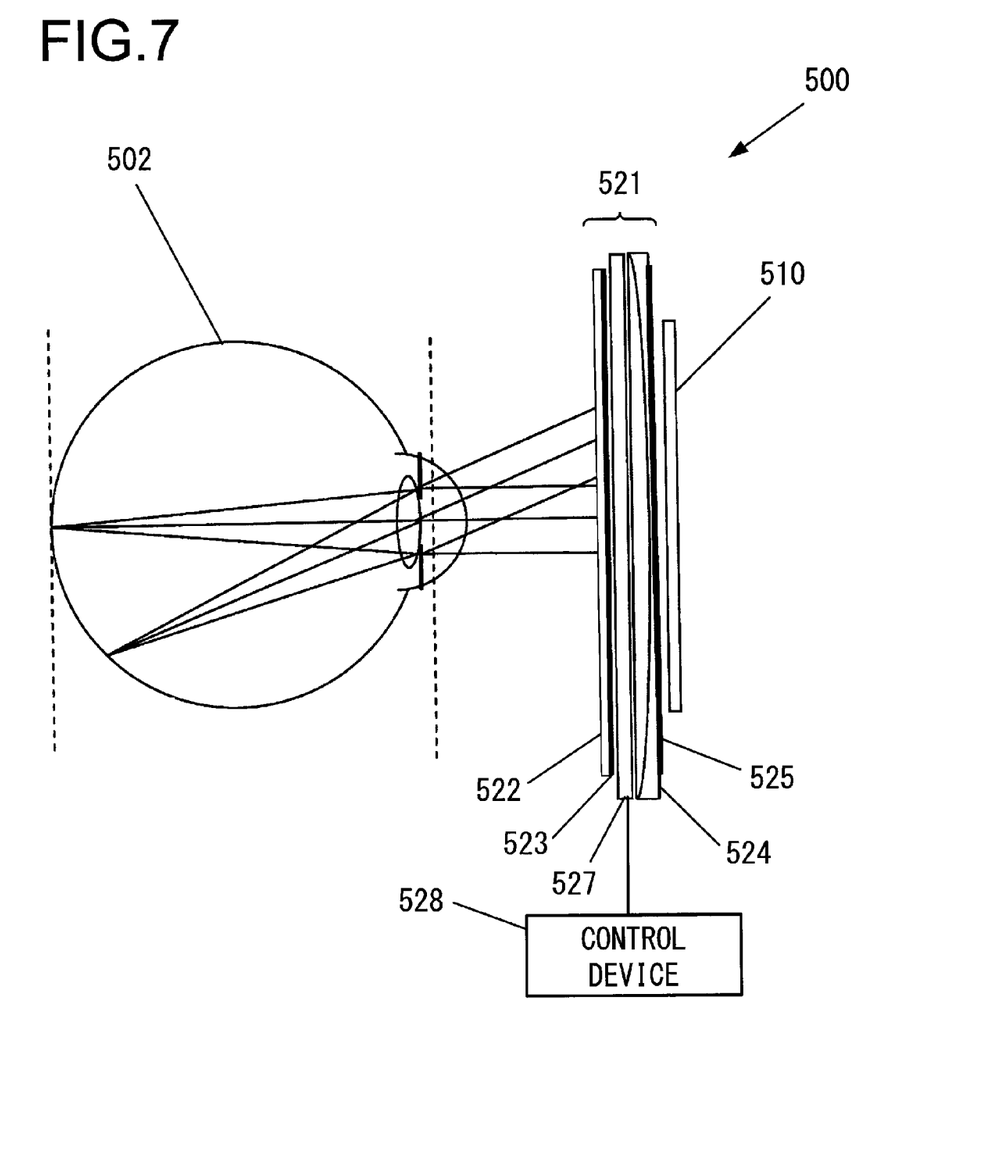
FIG. 7 is a view illustrating an example of applying a polarized light folding optical system to a head mount display system.

Thus, a polarized light folding optical system employing the configuration of the display device described in the above-described embodiments is introduced into the head mount display system. FIG. 7 illustrates an example in which a polarized light folding optical system 521 is applied to the head mount display system. In this figure, for the sake of convenience of the description, only the polarized light folding optical system 521 and a two-dimensional display element 510 which are arranged in the proximity of an eye 502 have been illustrated as the head mount display system 500, and other components have been omitted.

The polarized light folding optical system 521 in this embodiment is similar to a configuration of the micromirror 421 in the fourth embodiment provided with the liquid crystal plate 127 in the third embodiment. While a large number of the micromirrors 421 in the fourth embodiment are two-dimensionally arranged to construct the micromirror array 120, one polarized light folding optical system 521 in the fifth embodiment is provided corresponding to one eye 502 and one two-dimensional display element 510 to constitute the head mount display 500. In other words, the polarized light folding optical system 521 is an optical system that has a size corresponding to one eye 502 and is significantly larger than one micromirror 421 in the fourth embodiment, as can also be seen in FIG. 7.

In the polarized light folding optical system 521, a quarter-wave plate 525, a reflective mirror 524, a liquid crystal plate 527, a quarter-wave plate 523, and a reflective linear polarizer plate 522 are arranged in this order from the display surface of the two-dimensional display element 510. The two-dimensional display element 510 corresponds to the liquid crystal display 110 in the fourth embodiment, the quarter-wave plate 525 corresponds to the quarter-wave plate 125 in the fourth embodiment, the reflective mirror 524 corresponds to the reflective mirror 424 in the fourth embodiment, the liquid crystal plate 527 corresponds to the liquid crystal plate 127 in the third embodiment, the quarter-wave plate 523 corresponds to the quarter-wave plate 123 in the fourth embodiment, and the reflective linear polarizer plate 522 corresponds to the reflective linear polarizer plate 122 in the fourth embodiment.

The circularly polarized light splitting layer of the reflective mirror 524 is made of cholesteric liquid crystal and is configured to transmit the right circularly polarized light component and reflect the left circularly polarized light component, in the same manner as in the fourth embodiment. Furthermore, the reflective mirror 524 is arranged so that its concave surface is convex with respect to the two-dimensional display element 510 in the same manner as in the fourth embodiment. In other words, the reflective mirror 524 is arranged to orient to the observer side. Moreover, the reflective mirror 524 is arranged so that the display surface of the two-dimensional display element 510 is located at a position that is optically equivalent to the focus position of the reflective mirror 524.

Functions of the polarized light folding optical system 521 in this embodiment will now be described. A light having the P-polarization exits from the display surface of the two-dimensional display element 510 arranged in the right side of FIG. 7 towards the quarter-wave plate 525. The P-polarized light passes through the quarter-wave plate 525 to turn into a right circularly polarized light. The right circularly polarized light passes through the convex surface of the reflective mirror 524 and directs towards the liquid crystal plate 527. In the same manner as in the fourth embodiment, the right circularly polarized light, which transmits through the reflective mirror 524, is not refracted by the concave surface because the concave surface of the reflective mirror 524 is filled with the optical adhesive having the same refractive index as that of the transparent substrate.

The liquid crystal plate 527 is the same as the liquid crystal plate 127 in the third embodiment, wherein an orientation direction of the liquid crystal element changes depending on presence/absence of an applied voltage across the transparent electrodes (presence/absence of an applied voltage to the liquid crystal layer) in such a manner that it can be switched whether an incident light exits from the liquid crystal plate 527 unchanged or with a phase shift of 180 degree. In this way, if the voltage is applied (on), the incident light passes through the liquid crystal plate 527 unchanged, while if the voltage is not applied (off), the incident light exits with a phase shift of 180 degree. In the polarized light folding optical system 521 in this embodiment, it is possible to switch between magnification and see-through (non-magnification) of images of the two-dimensional display element 510 with the liquid crystal plate 527. It should be noted that a control on whether the voltage is applied to the liquid crystal plate 527 or not (on/off control) is performed by the control device 528.

If observation of magnified images is desired, the voltage is applied to the liquid crystal plate 527. The right circularly polarized light passing through the reflective mirror 524 is incident on the liquid crystal plate 527, and the light incident on the liquid crystal plate 527 exits from the liquid crystal plate 527 with its polarization direction being unchanged from that at the time of the incidence, i.e. the right circular polarization. The right circularly polarized light passes through the quarter-wave plate 523 to turn into a light having the S-polarization. The light having the S-polarization directs towards the reflective linear polarizer plate 522 and is reflected by the reflective linear polarizer plate 522 to direct again towards the quarter-wave plate 523. The light then passes through the quarter-wave plate 523 to turn into a left circularly polarized light.

The left circularly polarized light directs towards the concave surface of the reflective mirror 524. As described above, the concave surface acts as a concave mirror for the left circularly polarized light, by the effect of the circularly polarized light splitting layer. The left circularly polarized light reflects from the concave surface and simply transmits through the liquid crystal plate 527 to direct towards the quarter-wave plate 523. The light then passes through the quarter-wave plate 523 to turn into a light having the P-polarization. The light having the P-polarization directs again towards the reflective linear polarizer plate 522 and transmits through the reflective linear polarizer plate 522 to direct towards the observer. Thus, a light bundle having a focal point on the display surface of the two-dimensional display element 510 exits from the polarized light folding optical system 521 towards the observer.

On the other hand, if observation of non-magnified images in the see-through manner is desired, the voltage is not applied to the liquid crystal plate 527. In this case, when the right circularly polarized light transmitting through the reflective mirror 524 is incident on the liquid crystal plate 527, a phase shift of 180 degree is caused by the liquid crystal layer of the liquid crystal plate 127 and the light turns into a right circularly polarized light to direct towards the quarter-wave plate 523. The right circularly polarized light passes through the quarter-wave plate 523 to turn into a light having the P-polarization 17. The light having the P-polarization transmits through the reflective linear polarizer plate 522 to direct towards the observer. In other words, if the voltage is not applied to the liquid crystal plate 527, the light from the two-dimensional display element 510 simply passes through the polarized light folding optical system 521 towards the observer.

In the polarized light folding optical system 521 in this embodiment, for a given focus distance, the curvature is four times larger, i.e. r=2f, because a power is generated in the concave mirror. For the same diameter, the thickness is 2.4 mm. Furthermore, the distance from the concave surface to the display surface can be reduced by half, because the light follows the course of the display element (510)→ ¼λ(525)→the concave mirror (pass through) (524)→the liquid crystal (pass through; forward)→¼λ(523)→the polarization reflection plate (522)→¼λ(523)→TN liquid crystal (backward) (527)→concave mirror (reflection) (524), i.e. the light passes through the thickness of the concave mirror and the liquid crystal plate twice, so that this space can be used for both the forward and backward paths.

Therefore, by making the thickness of the center thinner and reducing the space required only for the focal length by half, the entire width can be reduced by approximately half. This effect may be utilized in the direction of the diameter, i.e. the diameter may be increased. As the diameter is increased, a permissible range of the position of the eye is increased, so that visibility is significantly enhanced or adjustment of the pd (pupil distance) is unnecessary.

On the other hand, when the plane of polarization is rotated in the liquid crystal plate 527, the light follows the course of the display element (510)→¼λ(525)→the concave mirror (pass through) (524)→the TN liquid crystal (pass through; forward) (527)→¼λ(523)→the polarization reflection plate (pass through) (522). This system has no refractive power. The above-described states can be dynamically switched by the control device 528 to provide a see-through display by switching with a constant duty cycle.

With the head mount display system according to the fifth embodiment described above, the following operations and advantageous effects can be achieved.

(1) Because the optical system is the polarized light folding optical system 521 as described above, it is possible to use an optical system that is thin, has a small maximum aperture value (has a high brightness), and exhibits no chromatic aberration, as an optical system of the head mount display system.

(2) Furthermore, by using such a polarized light folding optical system 521 in the head mount display system, it is possible to make the display part of the head mount display system thinner, provide a small maximum aperture value (a high brightness), and allow observation of images without chromatic aberration.

(3) Furthermore, it can be electrically switched by means of on/off of the liquid crystal plate 527, whether an image of the two-dimensional display element 510 is observed in a magnified manner or in an non-magnified and see-through manner.

The following variations are also within the scope of the present invention and one or more variations may be combined with the above-described embodiments.

(First Variation)

In the embodiments described above, the relationship of transmission/reflection (absorption) for the P-polarized light component and the S-polarized light component may be changed. For example, in FIG. 2, the reflective linear polarizer plate 122 may be adapted to transmit the S-polarized light component and reflect the P-polarized light component. In this case, the circularly polarized light splitting layer formed on the reflective mirror 124 may be formed to transmit a right circularly polarized light component and reflect a left circularly polarized light component. Furthermore, the absorptive linear polarizer plate 126 may be adapted to transmit the S-polarized light component and absorb the P-polarized light component, and the light having the S-polarized light component may exit from the liquid crystal display 110, instead of the light having the P-polarized light component.

(Second Variation)

The arrangement of a plurality of micromirrors in the micromirror array is not limited to the staggered arrangement as in the embodiments described above. For example, the present invention may be applied to a micromirror array having a plurality of micromirrors arranged in a square manner.

(Third Variation)

The present invention is also applicable to a display device for observation of stereoscopic images with a lenticular scheme. In this case, lenticular lenses having an elongate shape (strip shape) are formed in the same manner as the micromirrors in the embodiments described above and they are one-dimensionally arranged.

(Fourth Variation)

Although, in the embodiments described above, the examples of applying the present invention to the display device that allows observation of three-dimensional images have been described, the present invention is not limited to those embodiments. For example, the present invention is applicable to image-capturing devices or aberration measurement devices for optical systems. In this case, instead of the liquid crystal display 110, an image sensor such as CCDs or CMOSs may be arranged so that the position of an image-capturing surface matches the focus position of the reflective mirror 124. In addition, the optical members (micromirrors) of the present invention are applicable to a variety of devices that have conventionally employed a plurality of microlenses.

(Fifth Variation)

Although the example of using the polarized light folding optical system 521 in the head mount display has been described in the fifth embodiment, the present invention is not necessarily limited to this embodiment. The polarized light folding optical system 521 or an equivalent optical system is applicable to a variety of cases where objects to be observed are magnified for observation. Furthermore, in the same manner as the fourth variation, the present invention is applicable to image-capturing devices or aberration measurement devices for optical systems. In this case, instead of the two-dimensional display element 510, an image sensor such as CCDs or CMOSs may be arranged so that the position of an image-capturing surface matches the focus position of the reflective mirror 524.

As long as not compromising the characteristics of the present invention, the present invention is not limited to the above-described embodiments. Other embodiments conceivable within the scope of the technical idea of the present invention are encompassed within the scope of the present invention.

The disclosure of the following priority application is herein incorporated by reference:

Japanese Patent Application No. 2013-34585 (filed Feb. 25, 2013)

REFERENCE SIGNS LIST

100 . . . display device, 500 . . . head mount display, 110 . . . liquid crystal display, 510 . . . two-dimensional display element, 120 . . . micromirror array, 121, 221, 321, 421 . . . micromirror, 521 . . . polarized light folding optical system, 122, 522 . . . reflective linear polarizer plate, 123, 125, 523, 525 . . . quarter-wave plate, 124, 424, 524 . . . reflective mirror, 126 . . . absorptive linear polarizer plate, 127, 527 . . . liquid crystal plate

The invention claimed is:

1. A display device, comprising:
a display unit having a plurality of pixels;
a first optical member that transforms a first polarized light among lights from the plurality of pixels of the display unit into a second polarized light;
a second optical member having a plurality of concave surfaces that reflect the second polarized light having been transformed by the first optical member to be incident on the first optical member, wherein:

the first optical member transforms the second polarized light having been reflected by the plurality of concave surfaces of the second optical member into a third polarized light and reflects the third polarized light to be incident on the second optical member; and the plurality of concave surfaces of the second optical member transmit the third polarized light having been reflected by the first optical member.

2. The display device according to claim 1, wherein:
the first optical member includes a third optical member and a fourth optical member;
the third optical member transforms the first polarized light among lights from the plurality of pixels of the display unit into the second polarized light to be incident on the second optical member, transforms the second polarized light having been reflected by the plurality of concave surfaces of the second optical member into a fourth polarized light to be incident on the fourth optical member, and transforms the fourth polarized light having been reflected by the fourth optical member into the third polarized light to be incident on the second optical member; and
the fourth optical member is provided between the third optical member and the display unit, transmits the first polarized light among lights from the plurality of pixels of the display unit to be incident on the third optical member, and reflects the fourth polarized light having been transformed by the third optical member to be incident on the third optical member.

3. The display device according to claim 2, wherein:
the third optical member includes a wave plate; and
the fourth optical member includes a polarizer plate.

4. The display device according to claim 1, wherein:
the plurality of concave surfaces of the second optical member orient to the first optical member.

5. The display device according to claim 1, wherein:
the display unit is arranged around a focus position of the plurality of concave surfaces.

6. The display device according to claim 1, wherein:
the first optical member includes a fifth optical member that is capable of transforming a polarized light;
the first optical member switches between a state in which the first polarized light among lights from the plurality of pixels of the display unit is transformed into the second polarized light to be incident on the second optical member and a state in which the first polarized light among lights from the plurality of pixels of the display unit is transformed into the third polarized light to be incident on the second optical member, by making the fifth optical member transform a polarized light or not.

7. The display device according to claim 6, wherein:
the fifth optical member is provided between the third optical member and the fourth optical member; and
the fifth optical member switches between a state in which the first polarized light having transmitted through the fourth optical member among lights from the plurality of pixels of the display unit is not transformed and is transformed into the second polarized light by the third optical member to be incident on the second optical member, and a state in which the first polarized light having transmitted through the fourth optical member among lights from the plurality of pixels of the display unit is transformed into the fourth polarized light and the fourth polarized light having been transformed is transformed into the second polarized light by the third optical member to be incident on the second optical member.

8. The display device according to claim 7, wherein:
the fifth optical member includes a liquid crystal plate; and
a state in which a polarized light is transformed and a state in which a polarized light is not transformed are switched by an applied voltage to the liquid crystal plate.

9. The display device according to claim 1, wherein:
there is provided a member that reflects the second polarized light and transmits the third polarized light at the plurality of concave surfaces of the second optical member.

10. The display device according to claim 9, wherein:
the member that reflects the second polarized light and transmits the third polarized light includes a liquid crystal.

11. The display device according to claim 1, wherein:
a light from partial pixels of the plurality of pixels of the display unit that has been transformed into the second polarized light by the first optical member is reflected at a concave surface of the second optical member.

12. The display device according to claim 1, wherein:
the first polarized light corresponds to a first linearly polarized light;
the second polarized light corresponds to a first circularly polarized light;
the third polarized light corresponds to a second circularly polarized light; and
the fourth polarized light corresponds to a second linearly polarized light.

13. The display device according to claim 12, wherein:
the first circularly polarized light has a polarization direction that is opposite to a polarization direction of the second circularly polarized light; and
the first linearly polarized light has a polarization direction that is orthogonal to a polarization direction of the second linearly polarized light.

14. The display device according to claim 13, wherein:
the first circularly polarized light corresponds to a right circularly polarized light;
the second circularly polarized light corresponds to a left circularly polarized light;
the first linearly polarized light corresponds to a P-polarized light; and
the second linearly polarized light corresponds to a S-polarized light.

15. The display device according to claim 1, further comprising:
a sixth optical member, wherein:
the sixth optical member transforms a circularly polarized light, which is incident on the second optical member via the sixth optical member and is reflected, into a linearly polarized light, and shields the linearly polarized light having been transformed.

16. The display device according to claim 15, wherein:
the sixth optical member includes a polarizer plate and a wave plate;
the polarizer plate absorbs the first linearly polarized light and transmits the second linearly polarized light to be incident on the wave plate;
the wave plate transforms the second linearly polarized light having transmitted through the polarizer plate into a first circularly polarized light to be incident on the second optical member, and transforms the first circularly polarized light having been reflected at the plurality of concave surfaces of the second optical member into the first linearly polarized light to be incident on the polarized plate.

17. The display device according to claim 1, wherein:

the first polarized light among lights from the plurality of pixels of the display unit is transformed into the second polarized light by the first optical member to be incident on the second optical member;

the second polarized light having been transformed by the first optical member is reflected by the plurality of concave surfaces of the second optical member to be incident on the first optical member;

the second polarized light having been reflected by the plurality of concave surfaces of the second optical member is transformed into the third polarized light by the first optical member into the third polarized light and is reflected to be incident on the second optical member; and the third polarized light transmits through the plurality of concave surfaces of the second optical member.

* * * * *